(12) United States Patent
Addante

(10) Patent No.: US 8,538,804 B2
(45) Date of Patent: *Sep. 17, 2013

(54) METHOD AND APPARATUS FOR TRANSACTION TRACKING OVER A COMPUTER NETWORK

(75) Inventor: Frank Addante, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,783

(22) Filed: Jun. 29, 2012

(65) Prior Publication Data

US 2012/0296736 A1  Nov. 22, 2012

Related U.S. Application Data

(63) Continuation of application No. 09/851,029, filed on May 7, 2001, now abandoned.

(60) Provisional application No. 60/202,221, filed on May 5, 2000.

(51) Int. Cl.
*G06Q 30/02* (2012.01)

(52) U.S. Cl.
USPC ............ 705/14.1; 705/14.16; 705/14.23; 705/14.4; 705/26.1; 709/218

(58) Field of Classification Search
USPC ............ 705/14.1, 14.16, 14.23, 14.4, 26.1; 709/218
See application file for complete search history.

(56) References Cited

U.S. PATENT DOCUMENTS

| | | | |
|---|---|---|---|
| 5,796,952 | A | 8/1998 | Davis et al. |
| 5,819,285 | A | 10/1998 | Damico et al. |
| 5,933,811 | A | 8/1999 | Angles et al. |
| 5,948,061 | A | 9/1999 | Merriman et al. |
| 5,960,409 | A | 9/1999 | Wexler |
| 6,006,197 | A | 12/1999 | d'Eon et al. |
| 6,223,215 | B1 | 4/2001 | Hunt et al. |
| 6,247,047 | B1 | 6/2001 | Wolff |
| 6,434,614 | B1 | 8/2002 | Blumenau |

(Continued)

FOREIGN PATENT DOCUMENTS
WO  WO 98/57285  12/1998

OTHER PUBLICATIONS

Business Wire (New York, Nov. 17, 1998). "i33 Communications Links Personal Finance Sites with Dynamic Investment Research Banners; Quote.com and Multex Partner Using i33's AdMaximize Technolgy".
Prosecution History of U.S. Appl. No. 09/851,029.

*Primary Examiner* — Tri V Nguyen
(74) *Attorney, Agent, or Firm* — Fish & Richardson P.C.

(57) ABSTRACT

An apparatus and a method for tracking transactions over a computer network is provided. An advertisement is provided to a user using a web client, such as a web browser, at a user node. The user selects the advertisement, e.g., by clicking on the advertisement, to request to an ad server for redirection to a transaction node associated with the advertisement. The ad server formats a cookie and provides to the user node. When the user requests a transaction after the redirection, the transaction node sends a transaction confirmation after performing the transaction. The transaction confirmation includes a command to record the transaction. In response to the command, the user node provides a query string and the cookie to the ad server for the transaction to be recorded.

18 Claims, 3 Drawing Sheets

Nodes in a Transaction Tracking Network

(56) References Cited

U.S. PATENT DOCUMENTS

| | | |
|---|---|---|
| 6,466,970 B1 | 10/2002 | Lee et al. |
| 2002/0004733 A1 | 1/2002 | Addante |
| 2002/0072965 A1 | 6/2002 | Merriman et al. |
| 2002/0099600 A1* | 7/2002 | Merriman et al. .............. 705/14 |
| 2006/0129457 A1 | 6/2006 | Nyhan et al. |
| 2008/0167946 A1* | 7/2008 | Bezos et al. .................... 705/10 |

* cited by examiner

Sale Monitoring and Recording Operation Sequence

METHOD AND APPARATUS FOR TRANSACTION TRACKING OVER A COMPUTER NETWORK

CLAIM OF PRIORITY

The present application is a continuation and claims priority under 35 U.S.C. §120 to U.S. application Ser. No. 09/851,029, filed May 7, 2001, which is abandoned and which in turn claims priority under 35 U.S.C. §119(e) to Provisional Application No. 60/202,221, entitled "Method and Apparatus for Transaction Tracking over a Computer Network" filed May 5, 2000, the entire contents of each of which are fully incorporated by reference herein.

TECHNICAL FIELD

The present application relates to the field of digital advertising via computer networks, and more particularly, to a method and system for monitoring and recording transactions of a user who is redirected to a transaction site after selecting an advertisement, e.g., an ad banner, at a content site.

BACKGROUND

With the growth and commercialization of global computer networks, such as, for example, the Internet, delivery of advertisements over a computer network has become commonplace. Much of the content on the Internet is located on the World Wide Web, the often graphical portion of the Internet, which has become one of the most popular venue for accessing information. A user visiting a content site, which is a node on the computer network, and viewing an advertisement, known in the industry as a "creative," is often invited to select the advertisement, e.g., by clicking on the creative such as an ad banner.

Many creatives contain click-thru code in addition to the advertisement comprised of graphic and/or text. Click-thru code automatically redirects the user to another network site when the user clicks on the creative. Thus, upon selecting a particular advertisement, the user is typically redirected to another network site associated with the particular advertisement.

To assess effectiveness of an advertisement or a campaign, it is often desirable to gather some information about the advertisement viewed and/or selected by a particular user. In conventional systems, the number of times the particular user views a particular advertisement is typically tracked. The number of times the particular user selects the particular advertisement is also typically tracked in the conventional systems.

For more thorough assessment of effectiveness of an advertisement or a campaign, however, it is desirable to monitor and track not only the number of times each advertisement has been viewed or selected by a user, but also the transactions of the user while visiting the redirected network site. For example, purchases made by the user while at the redirected network site may be important for compiling user statistics such as spending habits, as well as for measuring ad effectiveness.

Further, advertising rates charged by a content site to advertisers, in many instances, are at least partly based on the effectiveness of the advertisements on the content site. Thus, any monitoring or tracking of user transactions at the network site being monitored should ensure that the user has been redirected to the network site, at least initially, by the advertisements viewed and selected at the content site.

Therefore, it is desirable for a content site to monitor and/or track transactions by a user redirected from the content site to the network site.

SUMMARY

One embodiment of the present invention is a computer network. The computer network includes a user node, which provides a request to perform a transaction. The computer network also includes a transaction node. The transaction node receives the request to perform the transaction, performs the transaction in response to the request and provides a transaction confirmation to the user node. The transaction confirmation includes a command to record the transaction. The user node provides a request to record the transaction in response to the command to record the transaction. In addition, the computer network includes a monitor node. The monitor node receives the request to record the transaction provided by the user node and records the transaction in response to the request.

In another embodiment of the present invention, the computer network includes a content node. The content node provides a content having a space for an advertisement to the user node. The user node receives the content having a space for an advertisement as well as the advertisement. A user selects the advertisement. Upon selection, the monitor node formats a small data block, known as a "cookie", with the selection information using a sale track program and sends the cookie to the user, and the user is redirected to the transaction node, at which the user may request for transaction. The transaction node provides a transaction confirmation to the user node upon transaction. The transaction confirmation includes a command to record the transaction. In response to the command to record the transaction, the user node provides a request to record the transaction to the monitor node. In addition, the user node provides a query string and the cookie to the monitor node. The monitor node compiles information from the query string and the cookie to update a transaction database.

Yet another embodiment of the present invention is a method of tracking transactions over a computer network. The method includes providing a request to perform a transaction from a user node to a transaction node. The method also includes performing the transaction at the transaction node. The method also includes providing a transaction confirmation, which includes a command to record the transaction. In addition, the method includes providing a request to record the transaction, in response to the command to record the transaction, and recording the transaction at the monitor node.

DESCRIPTION OF DRAWINGS

These and other features, aspects, and advantages of the present invention will become better understood with regard to the following description and accompanying drawings wherein.

DETAILED DESCRIPTION

Figure 1:
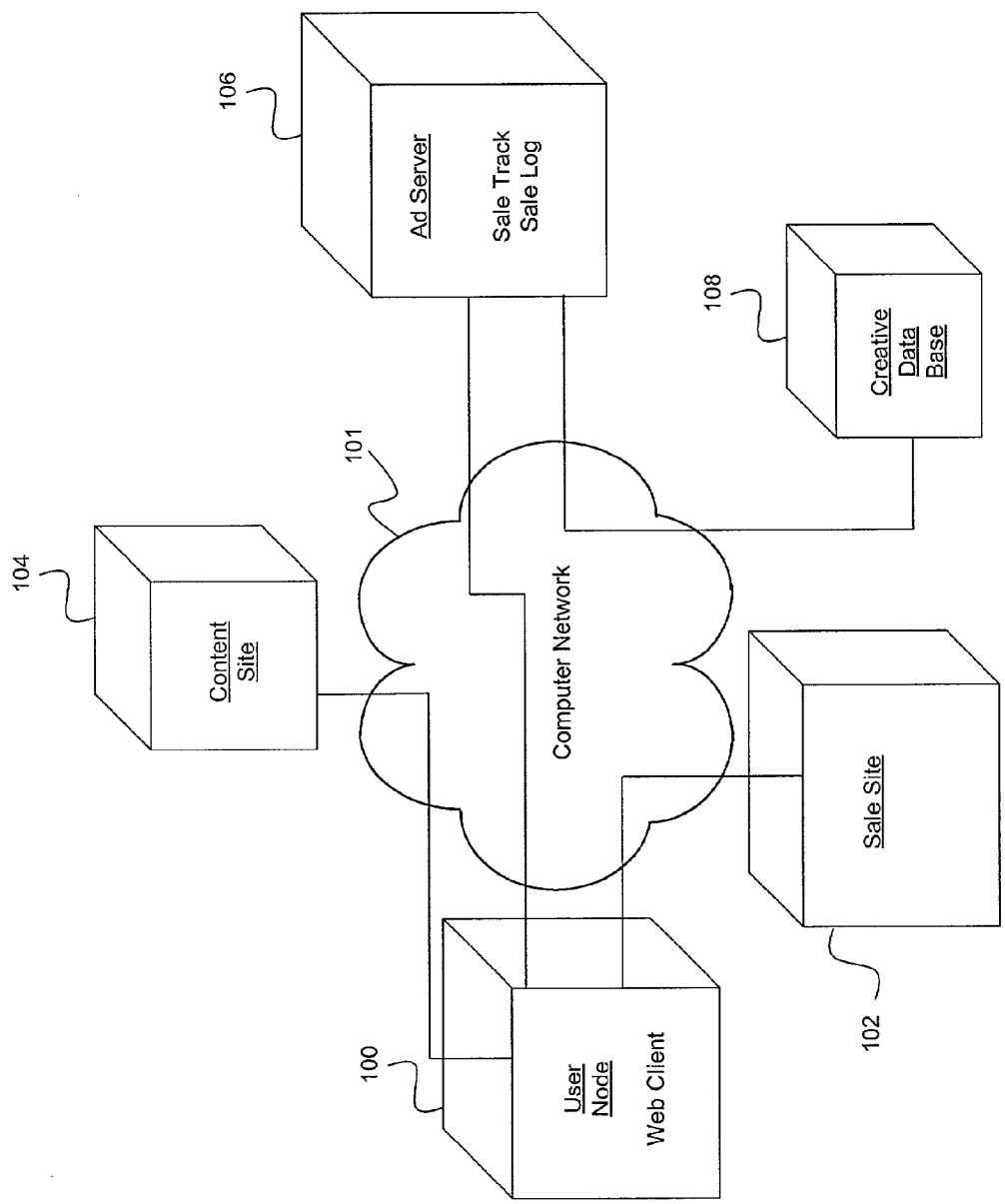
FIG. 1 is a block diagram of nodes in a transaction tracking network.

In the following embodiments of the present invention, common reference numerals are used to represent the same components. If the features of described embodiments are incorporated into a single system, these components may be shared and perform all the functions of the described embodiments.

FIG. 1 is a block diagram of nodes coupled together in a transaction tracking network in one embodiment according to the present invention. A user node 100 is coupled to a computer network 101. The computer network 101 may be a global computer network such as, for example, the Internet. As such, the computer network 101 may include many other nodes (e.g., servers, clients, databases, etc.) that are not illustrated in FIG. 1. The user node 100 typically includes a web client, which is used to retrieve information over the computer network. The web client may include web browsers such as, for example, Netscape Communicator or Internet Explorer.

Using the web client, a user at the user node 100 is capable of retrieving information from other nodes on the computer network 101. In one embodiment of the present invention, other nodes on the computer network include a sale (transaction) site 102, a content site 104, an ad server 106 and a creative database 108. Other embodiments of the present invention may include a subset of these nodes. Other embodiments may also include additional nodes. In addition, other embodiments may have one or more nodes coupled to the computer network other than the nodes that comprise the computer network of the present invention. Further, processes running on different nodes may be run at a single node, reducing the number of nodes in the transaction tracking network of the present invention.

The user at the user node 100 may receive a sale site page from the sale site 102. Based on information provided on the sale site page, the user may perform one or more transactions. For example, a transaction may be purchase of goods.

The user at the user node 100 may also receive a content site page from the content site 104. The content site page preferably includes one or more spaces for creatives, e.g., advertisements or transaction creatives. The creatives are typically provided by the creative database 108. However, creatives may also be provided by any of the other nodes, such as the sale site 102.

The ad server 106 preferably tracks transactions made by the user at the user node 100. In other words, the ad server 106 may include a monitor node that monitors and records the transactions. The ad server 106 in one embodiment of the present invention tracks transactions only after the user selects a creative associated with the transactions by, for example, clicking on the creative. In another embodiment of the present invention, the ad server includes two programs: a sale track program and a sale log program. The sale track program preferably formats an ad server cookie and stores the ad server cookie in the user node 100 when the user selects any of the creatives being monitored. The sale log program preferably records transactions between the user and the sale site after the user selects a creative associated with the sale site. The ad server 106 may also report the recorded transactions to the user node 100, the sale site 102 or to any other node on the computer network.

Communications between various nodes, e.g., the user node 100 and the sale site 102, on the computer networks, such as the Internet, typically take place using the TCP/IP (Transfer Control Protocol/Internet Protocol) communications protocols as the base layer. At higher layer, the communications typically use HTTP (HyperText Transfer Protocol) and HTML (HyperText Markup Language). The communications may also use, but are not limited to, UDP (User Datagram Protocol), XML (Extensible Markup Language) or other SGML (Standard Generalized Markup Language) formats. A detailed description of the IP communications protocol is discussed in Internetworking with TCP/IP, 3rd ed., Douglas Comer, Prentice Hall, 1995, which is fully incorporated herein by reference.

The user typically begins the communication by transmitting a request, e.g., an HTML request, for content to one of the other nodes on the computer network. To initiate the communication, the user typically instructs a web client, e.g., software program such as a web browser, to transmit the request for content. Hereafter for the sake of clarity, the term user will be used to identify the user node as well as the web client on the user node. The request for content is typically in the form of an HTTP request for a URL (Universal Resource Locator).

In response to the request for content, the node receiving the request typically returns the requested content, which typically includes a web page containing HTML code. The node receiving the request may also send a redirection command to redirect the user to one of the other nodes on the computer network. Typical redirection commands include HTML <href> or <img> commands, or an HTTP redirect command containing a fully qualified URL. HTML and HTTP are well known in the art. Comprehensive documentation about HTML, HTTP and related topics are disclosed in HTML 4.0 Sourcebook, Ian S. Graham, John Wiley and Sons, Inc., 1998, which is fully incorporated herein by reference.

Figure 2:
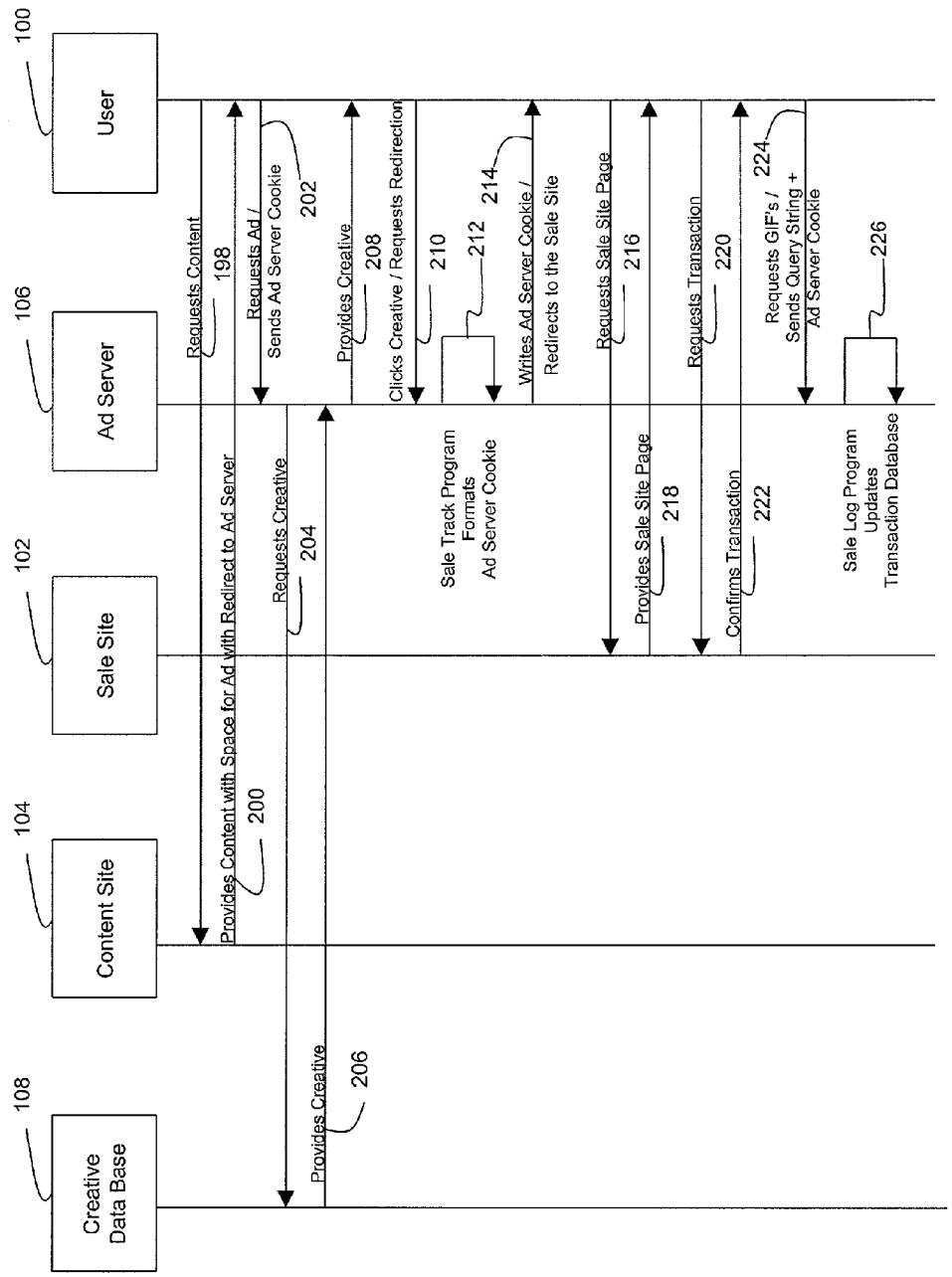
FIG. 2 is a sequence diagram illustrating monitoring and recording of transactions initiated by clicking on a creative.

FIG. 2 is a sequence diagram of a sale tracking operation in an embodiment according to the present invention. At the request 198 of the user 100, the content site 104 provides content in step 200. The content typically includes a web page requested by the user 100, and may include a space for one or more creatives, e.g., advertisements. The creatives may be provided by the content site 104; the creatives, however, preferably are provided by the creative data base 108, as indicated in step 206.

In the embodiment illustrated in FIG. 2, the user provides a request for advertisement 202, to be placed in the space of the content, to the ad server 106. In other embodiments, the user 100 may provide a request for advertisement directly to the creative data base 108. For example, the transaction tracking network of the present invention also contains certain features, including requesting, selecting, transmitting, receiving and displaying of creatives, disclosed in commonly owned U.S. patent application Ser. No. 09/757,389 filed Jan. 8, 2001 and entitled "Method and Apparatus for Selecting and Delivering Internet Based Advertising," the contents of which are fully incorporated herein by reference.

Referring back to FIG. 2, when the user 100 provides a request for advertisement 202 to the ad server 106, the user sends a cookie associated with the ad server 106 if one is available. Cookies are typically written by a web server, e.g., the ad server 106, on a hard drive of the node that runs a web client, e.g., the user 100, requesting to the web server. Once a cookie has been created, the web client typically sends it to the web server that created the cookie every time the web client requests content from that web server. A cookie may be overwritten by the web server the next time the web server that created the cookie is accessed. Each cookie typically has an expiration date, which may be determined by the web server creating it. Upon reaching the expiration date, the web client typically erases the cookie from the hard drive. Use of cookies in client-server interface is well known to those skilled in the art.

Upon receiving the request for advertisement 202 from the user 100, the ad server 106 preferably provides a request for creative 204 to the creative database 108. In response, the creative database 108 in step 206 provides a creative to the ad server 106. In turn, the ad server 106 in step 208 provides the creative to the user 100. The creative received by the user 100 may be an ad banner or a java script, e.g., multimedia creative, depending on the HTML tag used in the content with space for creative provided by the content site 104. The creative may also be an HTML file.

As long as the user 100 does not select the creative, e.g., by clicking on an ad banner, the user typically does not make any additional requests to the ad server 106. When the user selects the creative in step 210, however, the user is requesting to be redirected to a site associated with the creative. In the embodiment of the present invention illustrated in FIG. 2, the user makes a request to be redirected to the sale site 102. Upon receiving the request for redirection to the sale site 102, the ad server 106 formats an ad server cookie to be written to a hard drive associated with the user. More specifically, the ad server 106 includes a sale track program for tracking user's selection of creatives. The sale track program formats the ad server cookie in step 212. In this embodiment, the sale track program is a CGI (Common Gateway Interface) script. The sale track program may also be written using other software programming/scripting languages such as Perl.

In this embodiment, the ad server cookie is set using a format including the following: Set-Cookie: <sale site code>=<content site code>.about.<content site category code>.vertline.<creat-ive code>.vertline.<campaign code>.vertline.<cookie ID>.vertline.<cookie setting date>.vertline.<cookie setting time>.vertline. Each of the fields of the creative typically contains an alphanumeric content comprised of numbers, letters or both. FIG. 3A is a block diagram that shows data structure of an ad server cookie 300 in one embodiment of the present invention. The ad server cookie 300 is associated with a sale site code. The sale site preferably is a destination specified by the tag associated with the creative. The sale site code preferably uniquely identifies the sale site.

The ad server cookie 300 includes a content site code 302, which is typically associated with the content site 104 that provides the content with space for creative. The ad server cookie may also include a content site category code 304 and a content site subcategory code 306. The content site category code 304 is typically associated with a specific area, such as a particular page, at the content site 104. The content site subcategory code 306 may be associated with a more specific area of the content site 104.

A creative code 308 preferably is associated with the creative that has been selected by the user. A campaign code 310 preferably is associated with an advertising campaign during which the creative was viewed and selected. A cookie ID 312 is an identification of the ad server cookie. A cookie setting date 314 signifies the date at which the ad server cookie has been created. A cookie setting time 316 signifies the time at which the ad server cookie has been created. The ad server cookie may optionally include a keyword 318. The keyword 318 may be used to track transactions by keyword when the keyword is provided.

Referring back to FIG. 2, the ad server 106 preferably provides the formatted ad server cookie in step 214 to the user 100 to write to the hard drive. The user 100 typically has an option (through setting options in the web browser) not to accept the ad server cookie. If the user refuses to accept the ad server cookie, it is not written to the hard drive, and the ad server typically is unable to continue monitoring and recording transactions beyond this point. If the user accepts the ad server cookie, it is written to the hard drive, and is typically transmitted back to the ad server when the user requests content, e.g., a web page, from the ad server.

When providing the ad server cookie to the user 100, the ad server 106 preferably also transmits a redirection command to the user. The redirection command typically contains a URL to a specific server (or a site) on the computer network. In this embodiment, the redirection command contains the URL of the sale site at which the user may make purchases or perform other transactions such as product and price inquiries.

The user 100 provides a request for sale site page in step 216 using the URL provided by the ad server 106. Upon receiving the request for sale site page, the sale site 102 provides the sale site page in step 218 to the user 100. While browsing the sale site page using a web client, the user may provide a request for transaction 220 to perform transactions such as purchases or inquiries. The sale site 102 confirms the transaction by transmitting a transaction confirmation page to the user in step 222.

The transaction confirmation page contains HTML tags that calls the ad server 106. For example, in one embodiment of the present invention, the transaction confirmation page includes a tag to request for invisible GIFs, such as 1.times.1 GIFs, from the ad server 106. If the user accepted the ad server cookie earlier, the ad server cookie is provided to the ad server 106 in step 224 along with the request for GIFs.

In addition to the request for GIFs and the ad server cookie, the web client 100 provides a query string to the ad server 106. The query string may be in any format and may include such transaction information as purchased products and purchase prices. FIG. 3B is a data structure for a query string 320 in one embodiment of the present invention. The query string has a format <sale (transaction) site code>.vertline.<PAGE>.vertline.<SIGNUPS>.vertline.<AMOU-NT>.vertline.<PRODUCT>.

A sale (transaction) site code field 322 includes the identity of the transaction site where the user makes transactions. A PAGE field 324 may include any pre-determined information such as time elapsed during transactions. A SIGNUPS field 326 may include any pre-determined information such as type of sale. An AMOUNT field 328 may include any pre-determined information such as purchase price. A PRODUCT field 330 may include any pre-determined information such as purchased product. The length of the query string is typically not limited to the embodiment in FIG. 3B, and other pre-determined fields may be included in the query string data structure 320.

The ad server 106 also includes a sale log program for updating a transaction database using the ad server cookie and the query string. The sale log program checks the ad server cookie to determine if it is associated with the sale (transaction) site 102. If the ad server cookie is associated with the sale site, the sale log program in step 226 updates the transaction database. During this update, the content site 104 is credited with providing initial redirection of the user to the sale site 102. The sale log program may be a CGI script or it may be written in another software programming/scripting language such as Perl.

Figure 3C:
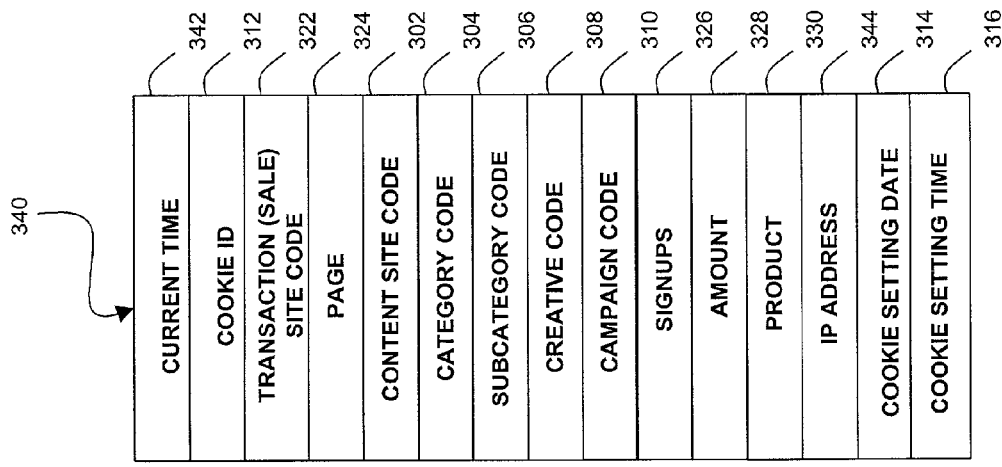
FIG. 3C is a data structure for one embodiment of recorded transaction in a transaction database. Like reference symbols in the various drawings indicate like elements.
Figure 3B:
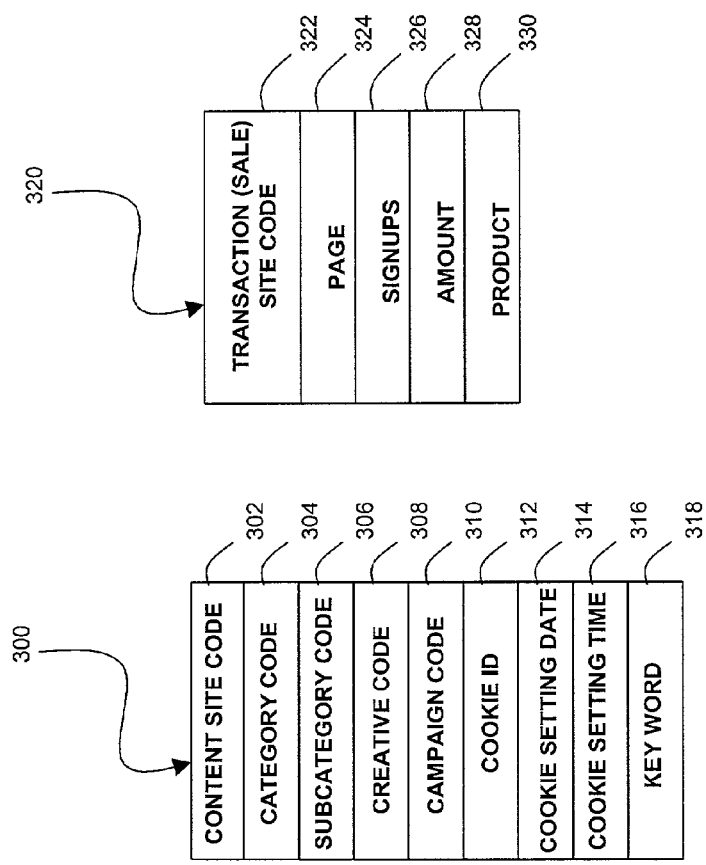
FIG. 3B is a data structure for one embodiment of query string.
Figure 3A:
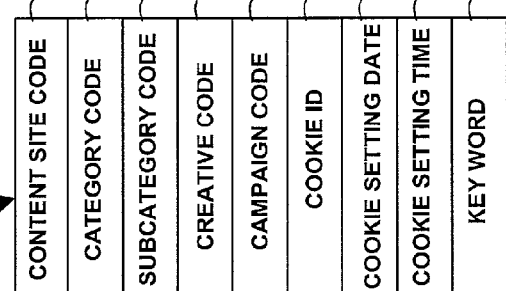
FIG. 3A is a data structure for one embodiment of cookie.

FIG. 3C is a data structure for transaction information 340 in the transaction database. The transaction information 340 includes all data fields from the ad server cookie 300 of FIG. 3A and the query string of FIG. 3B except for the cookie ID field 312 and the keyword field 318. In addition, the transaction information 340 includes a current time field 342 and an IP address field 344. The current time field 342 contains the time when the sale log program was called to log the transaction and the IP address field 344 contains the IP address of the user node 100.

The data structure for transaction information 340 is designed to gather transaction information that is valuable to the interested parties. The transaction information is particularly valuable to the owner of the content site 104 who is credited with transactions made at the sale site 102 subsequently to the initial redirection from the content site 104. The transaction information is also valuable to the advertisers for measuring ad effectiveness and for gathering statistics on such useful information as products browsed, products purchased, purchase amounts and individual spending habits.

For example, by counting the number of users redirected to the sale site 102 and/or the number of transactions made in reference to the creative code and the campaign code, the advertisers, e.g., sale site owners, may quantitatively assess effectiveness of a particular creative or a particular campaign, respectively. The advertisers may also be able to assess effectiveness of placing advertisements in association with a particular content site by analyzing the content site codes logged in the transaction database.

For another example, by comparing the cookie setting time and date against the current time in each of the data structures for transaction information, the advertisers may be able to build a statistical database on such information as average time interval between initial redirection and actual transaction.

The data structures for the ad server cookie 300 in FIG. 3A, the query string 320 in FIG. 3B, and the transaction information 340 in FIG. 3C, are provided for illustrative purposes only. Each of these structures may also contain many other types of information that are valuable to content site owners, advertisers, e.g., sale site owners, and other interested parties, such as the ad server provider. For example, one or more of the three data structures may include a field that contain user-provided information such as age, gender or location of the user.

Referring back to FIG. 2, the steps of the sale monitoring and recording operation sequence do not necessarily take place in one continuous transaction sequence. Instead, there may be a gap of hours, days, or even weeks between two adjacent steps. For example, the user 100 may be redirected to the sale site in step 214, requests the sale site page in step 216 and be provided the sale site page in step 218, in one continuous transaction sequence. However, the user may or may not request transaction in step 220 immediately thereafter.

The user may view the sale site page provided in step 218, but may choose not to proceed with providing a request for transaction as in step 220 at that time. The user may choose to leave the sale site and may even choose to exit the web client altogether. Then the user may choose to request the sale site page at a later time, after a period of hours, days, or even weeks. At this later time, the user may request to be redirected to the sale site by clicking on the creative as in step 208. The user may also request the sale site page simply by entering the URL for the sale site into an address command window of a web client, e.g., Address Bar of Internet Explorer or Location Toolbar of Netscape Communicator.

In the described embodiments of the present invention, once the user is initially redirected to the sale site through clicking on the creative, any subsequent transaction the user makes at the sale site is tracked by the sale log program and entered in the transaction data base, regardless of the method by which user subsequently enters the sale site to make the transaction and regardless of the time interval between the initial redirection and the subsequent transaction. This logging of every transaction continues because the ad server cookie, which prompts the sale log program to update the transaction database, is provided to the ad server upon confirmation of each transaction.

The ad server cookie in the content site code field 302 contains information on the content site through which the user is initially redirected to the transaction site. Therefore, as long as the ad server cookie remains in the hard drive of the user, the content site information is provided to the ad server, as in step 224, upon confirmation of transaction as in step 222. Consequently, the content site is credited with the transaction whenever the sale log program updates the transaction database as in step 226.

Accordingly, the present invention provides a method and apparatus for tracking transactions over a computer network, such as the Internet. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

What is claimed is:

1. A method implemented by a computing device, comprising:
   receiving, at the computing device and from an ad server, a creative;
   transmitting, to the ad server from the computing device in response to selection of the creative, a request for redirection to a sale site page associated with the creative;
   receiving, at the computing device and from the ad server, (i) a redirection command to redirect the computing device to the sale site page, and (ii) a cookie formatted at the ad server with a creative code to uniquely identify the creative;
   requesting, by the computing device and from a sale site server, based on execution of the redirection command, the sale site page;
   sending, to the sale site server and from the computing device, in response to receipt of the sale site page, a request for a transaction to be performed through the sale site page;
   receiving, at the computing device and from the sale site server, a confirmation of the transaction, wherein the confirmation of the transaction is stored in the cookie;
   recording, by the computing device, the confirmation of the transaction stored in the cookie; and
   sending, to the ad server from the computing device in response to the confirmation, information indicative of the transaction performed that is stored in the cookie.

2. The method of claim 1, wherein the information indicative of the transaction performed comprises a query string with information specifying one or more purchased products and one or more purchase prices.

3. The method of claim 1, wherein the query string includes a data structure with a field for entry of information specifying an identity of the sale site page.

4. The method of claim 1, further comprising:
   sending a request for content; and
   receiving, in response to the request for content, the content with a space for one or more creatives.

5. The method of claim 4, further comprising:
   requesting, in response to receipt of the content with the space, the ad creative.

6. The method of claim 1, further comprising:
receiving the sale site page.

7. One or more non-transitory machine-readable media configured to store instructions that are executable by a computing device to perform operations comprising:
receiving, at the computing device and from an ad server, a creative;
transmitting, to the ad server from the computing device in response to selection of the creative, a request for re-direction to a sale site page associated with the creative;
receiving, at the computing device and from the ad server, (i) a redirection command to redirect the computing device to the sale site page, and (ii) a cookie formatted at the ad server with a creative code to uniquely identify the creative;
requesting, by the computing device and from a sale site server, based on execution of the redirection command, the sale site page;
sending, to the sale site server and from the computing device, in response to receipt of the sale site page, a request for a transaction to be performed through the sale site page;
receiving, at the computing device and from the sale site server, a confirmation of the transaction, wherein the confirmation of the transaction is stored in the cookie;
recording, by the computing device, the confirmation of the transaction stored in the cookie; and
sending, from the computing device to the ad server in response to the confirmation, information indicative of the transaction performed that is stored in the cookie.

8. The one or more non-transitory machine-readable media of claim 7, wherein the information indicative of the transaction performed comprises a query string with information specifying one or more purchased products and one or more purchase prices.

9. The one or more non-transitory machine-readable media of claim 7, wherein the query string includes a data structure with a field for entry of information specifying an identity of the sale site page.

10. The one or more non-transitory machine-readable media of claim 7, wherein the operations further comprise:
sending a request for content; and
receiving, in response to the request for content, the content with a space for one or more creatives.

11. The one or more non-transitory machine-readable media of claim 10, wherein the operations further comprise:
requesting, in response to receipt of the content with the space, the ad creative.

12. The one or more non-transitory machine-readable media of claim 7, wherein the operations further comprise:
receiving the sale site page.

13. An electronic system comprising:
one or more processing devices; and
one or more non-transitory machine-readable media configured to store instructions that are executable by a computing device to perform operations comprising:
receiving, at the computing device and from an ad server, a creative;
transmitting, to the ad server from the computing device in response to selection of the creative, a request for re-direction to a sale site page associated with the creative;
receiving, at the computing device and from the ad server, (i) a redirection command to redirect the computing device to the sale site page, and (ii) a cookie formatted at the ad server with a creative code to uniquely identify the creative;
requesting, by the computing device and from a sale site server, based on execution of the redirection command, the sale site page;
sending, to the sale site server and from the computing device, in response to receipt of the sale site page, a request for a transaction to be performed through the sale site page;
receiving, at the computing device and from the sale site server, a confirmation of the transaction, wherein the confirmation of the transaction is stored in the cookie;
recording, by the computing device, the confirmation of the transaction stored in the cookie; and
sending, from the computing device to the ad server in response to the confirmation, information indicative of the transaction performed that is stored in the cookie.

14. The electronic system of claim 13, wherein the information indicative of the transaction performed comprises a query string with information specifying one or more purchased products and one or more purchase prices.

15. The electronic system of claim 13, wherein the query string includes a data structure with a field for entry of information specifying an identity of the sale site page.

16. The electronic system of claim 13, wherein the operations further comprise:
sending a request for content; and
receiving, in response to the request for content, the content with a space for one or more creatives.

17. The electronic system of claim 16, wherein the operations further comprise:
requesting, in response to receipt of the content with the space, the ad creative.

18. The electronic system of claim 13, wherein the operations further comprise:
receiving the sale site page.

* * * * *

UNITED STATES PATENT AND TRADEMARK OFFICE
CERTIFICATE OF CORRECTION

PATENT NO. : 8,538,804 B2  
APPLICATION NO. : 13/537783  
DATED : September 17, 2013  
INVENTOR(S) : Frank Addante Page 1 of 1

It is certified that error appears in the above-identified patent and that said Letters Patent is hereby corrected as shown below:

Title Page, Column 2, under "Other Publications" at Line 4:

Delete "Technolgy" and insert -- Technology --, therefor.

Signed and Sealed this  
Eighteenth Day of February, 2014

Michelle K. Lee  
*Deputy Director of the United States Patent and Trademark Office*